(12) United States Patent
Downs et al.

(10) Patent No.: US 7,363,995 B2
(45) Date of Patent: Apr. 29, 2008

(54) OVERRUNNING CLUTCH AND METHOD OF CONTROLLING ENGAGEMENT OF SAME

(75) Inventors: James P. Downs, South Lyon, MI (US); Robert J. Degowske, Fair Haven, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 117 days.

(21) Appl. No.: 11/415,483

(22) Filed: May 1, 2006

(65) Prior Publication Data
US 2007/0251748 A1  Nov. 1, 2007

(51) Int. Cl.
*B60K 17/356* (2006.01)
(52) U.S. Cl. .................. 180/65.1; 180/65.6; 180/292
(58) Field of Classification Search ............... 180/292, 180/293, 65.1, 65.5, 65.6, 65.7
See application file for complete search history.

(56) References Cited

U.S. PATENT DOCUMENTS

| | | | |
|---|---|---|---|
| 3,799,284 A * | 3/1974 | Hender | 180/65.2 |
| 4,042,056 A | 8/1977 | Horwinski | |
| 4,418,777 A * | 12/1983 | Stockton | 180/65.6 |
| 4,533,011 A | 8/1985 | Heidemeyer et al. | |
| 5,419,406 A | 5/1995 | Kawamoto et al. | |
| 5,428,274 A | 6/1995 | Furutani et al. | |
| 5,635,805 A | 6/1997 | Ibaraki et al. | |
| 5,722,502 A | 3/1998 | Kubo | |
| 5,786,640 A | 7/1998 | Sakai et al. | |
| 5,971,123 A | 10/1999 | Ochab et al. | |
| 5,996,758 A | 12/1999 | Baxter, Jr. | |
| 6,008,606 A | 12/1999 | Arai et al. | |
| 6,024,182 A | 2/2000 | Hamada et al. | |
| 6,326,702 B1 | 12/2001 | Yonekura et al. | |
| 6,333,620 B1 | 12/2001 | Schmitz et al. | |
| 6,355,996 B1 * | 3/2002 | Birkestrand | 310/54 |
| 6,524,215 B1 | 2/2003 | Schmidt | |
| 6,557,680 B2 | 5/2003 | Williams | |
| 6,602,159 B1 | 8/2003 | Williams | |
| 6,622,837 B2 | 9/2003 | Ochab et al. | |
| 6,652,407 B2 | 11/2003 | Ronk et al. | |
| 6,688,412 B2 * | 2/2004 | Kima et al. | 180/65.5 |
| 6,691,809 B2 | 2/2004 | Hata et al. | |
| 6,719,109 B1 | 4/2004 | Li et al. | |
| 6,817,432 B2 | 11/2004 | Kitada et al. | |
| 6,846,257 B2 | 1/2005 | Baker et al. | |

(Continued)

*Primary Examiner*—Christopher P. Ellis
*Assistant Examiner*—Brian L. Swenson
(74) *Attorney, Agent, or Firm*—Harness, Dickey & Pierce, P.L.C.

(57) ABSTRACT

A suspension module with a suspension component, wheel hubs coupled to the suspension component, and a drive system. The drive system has a pair of units that selectively provide drive torque to an associated one of the wheel hubs. Each unit includes a motor, a first reduction gearset and an overrunning clutch. The first reduction gearset is disposed between the motor and its wheel hub and multiplies torque output from the motor. The clutch disconnects the motor from the associated wheel hub so that an output shaft of the motor is not drivingly coupled to the associated wheel hub when a rotational speed of the first portion does not exceed a rotational speed of the second portion. The clutch can be selectively operated to drivingly couple the motor to its wheel hub to permit the motor to be back-driven. A method for operating a hybrid power train is also provided.

18 Claims, 4 Drawing Sheets

U.S. PATENT DOCUMENTS

| | | |
|---|---|---|
| 7,017,542 B2 | 3/2006 | Wilton et al. |
| 7,028,583 B2 | 4/2006 | Bennett |
| 7,108,087 B2 | 9/2006 | Imai |
| 7,165,640 B2 * | 1/2007 | Laurent et al. ............ 180/65.5 |
| 7,214,156 B2 * | 5/2007 | Oliver .......................... 475/8 |
| 2003/0111280 A1 * | 6/2003 | Platner et al. ............. 180/65.6 |
| 2005/0161948 A1 | 7/2005 | Yang |
| 2005/0224264 A1 | 10/2005 | Perrin |
| 2006/0201725 A1 | 9/2006 | Kano et al. |
| 2006/0225930 A1 | 10/2006 | Schulte |

\* cited by examiner

OVERRUNNING CLUTCH AND METHOD OF CONTROLLING ENGAGEMENT OF SAME

INTRODUCTION

The present disclosure generally relates to vehicle drive trains and more particularly to a vehicle drive train having a secondary power source, such as one or more electric motors, for providing part-time all-wheel drive capability.

It is known in the art to provide an all-wheel drive vehicle drive train that provides drive torque to the front and rear wheels of a vehicle on either a full-time basis or a part-time but automatically-engaging basis. The known full-time all-wheel drive configurations typically utilize a transfer case or power transfer unit and a center differential or coupling to distribute drive torque to a front differential, which in turn distributes drive torque to the set of front wheels, and a rear differential, which in turn distributes drive torque to the set of rear wheels. The known part-time all-wheel drive configurations typically utilize a power transmitting coupling that permits a set of wheels (e.g., the rear wheels) to coast until the other set of wheels (e.g., the front set of wheels) begin to loose traction.

One drawback of these all-wheel drive arrangements concerns their complexity and overall cost. Not only are the components of the all-wheel drive system relatively complex and costly to manufacture and install, the associated vehicle architecture is frequently more complex due to the common practice of vehicle manufacturers to offer vehicles with a standard two-wheel configuration and an optional all-wheel drive configuration. In this regard, it is frequently necessary to modify the vehicle fuel tank and/or relocate the spare tire of the vehicle to incorporate a conventional four-wheel drive system into a two-wheel drive vehicle.

One proposed solution involves the use of wheel hub motors. In these systems, relatively large electric motors are placed within the circumference of two or more of the vehicle wheels. As wheel hub motors are relatively large in diameter, the size of the wheel tends to be relatively large (i.e., 18 inches or greater). Consequently, wheel hub motors may not be practical as when a relatively small wheel size is employed or where packaging issues, such as the size and location of a fuel tank or the location of a spare tire, prevent a wheel hub motor from being integrated into the vehicle.

In view of the above discussion, it will be apparent that it has heretofore been impractical to offer an all-wheel drive system in a relatively inexpensive vehicle platform. Accordingly, there remains a need in the art for an improved vehicle drive train that permits a vehicle to be equipped with all-wheel drive in a manner that is relatively inexpensive.

One improved vehicle drive train that permits an entry-level vehicle to be equipped with all-wheel drive in a manner that is relatively inexpensive is disclosed in commonly assigned copending U.S. patent application Ser. No. 11/415,457 entitled "Vehicle with Hybrid Power Train Providing Part-Time All-Wheel Drive" filed on even date herewith, which is hereby incorporated by reference as if fully set forth in its entirety herein. This patent application discloses a suspension module that utilizes a pair of drive units; each drive unit includes an electric motor for driving a wheel hub through a gear reduction and an overrunning clutch that can decouple the electric motor from the wheel hub.

While the overrunning clutch can advantageously improve the efficiency of the hybrid power train by preventing back-driving of the electric motor when the drive units have not been activated (e.g., at high vehicle speeds), we have noted that there are times where back-driving of the electric motor would be desirable, for example for performing a regenerative braking operation.

SUMMARY

In one form, the present teachings provide a suspension module having a suspension component, a pair of wheel hubs and an auxiliary drive system. The wheel hubs are coupled to the suspension component and are adapted to be mounted to a vehicle wheel. The auxiliary drive system has a pair of drive units, each of which being selectively operable for providing drive torque to an associated one of the wheel hubs. Each drive unit includes an electric motor, a first reduction gear set and a clutch. The first reduction gear set is disposed between the electric motor and the associated wheel hub and multiplies the torque output from the electric motor. The clutch includes a clutch housing, an input member, an output member, an engagement member, first and second springs, an armature and a coil. The input member is rotatably disposed in the clutch housing and drivingly coupled with an output shaft of the electric motor. The output member is rotatably disposed in the clutch housing and drivingly coupled with the associated one of the wheel hubs. The engagement member is threadably coupled to one of the input member and the output member and movable between a first position, wherein the engagement member is abutted against a first engagement surface to couple the input member and the output member for rotation with one another, a second position, wherein the engagement member is abutted against a second engagement surface to couple the input member and the output member for rotation with one another, and a neutral position, wherein the engagement member is spaced apart from both the first engagement surface and the second engagement surface. The first spring is disposed between the clutch housing and a first side of the engagement member and biases the engagement member toward the first engagement surface. The second spring is disposed between the clutch housing and a second side of the engagement member and biases the engagement member toward the second engagement surface. The armature is coupled to the first spring. The coil is coupled to the clutch housing. The clutch is operable for connecting the electric motor with the associated wheel hub when a rotational speed of the input member exceeds a rotational speed of the output member. The coil is selectively operable for moving the armature to compress the first spring to thereby move the engagement member into the first position when the rotational speed of the input member does not exceed a rotational speed of the output member.

In another form, the present teachings provide a method that includes: providing a suspension module with at least one suspension component, a pair of wheel hubs and an auxiliary drive system, each wheel hub being coupled to the at least one suspension component and adapted to be mounted to a vehicle wheel, the auxiliary drive system having a pair of drive units, each drive unit including an electric motor, a first reduction gear set and a clutch, the first reduction gear set being disposed between the electric motor and the associated wheel hub and multiplying torque output from the electric motor, the clutch being disposed between the first reduction gear set and the wheel hub and having an input member, an output member, an engagement member and a coil assembly, the engagement member being threadably coupled to one of the input member and the output member and movable between a first position, wherein the engagement member is abutted against a first engagement surface to couple the input member and the output member for rotation with one another, and a neutral position, wherein the engagement member is spaced apart from the first engagement surface, the engagement member being biased into the neutral position and moving into the first position in response to rotation of the input member in a predetermined rotational direction at a rotational speed that exceeds a rotational speed of the output member; and activating the coil assembly to place the engagement member in the first position when the input member is rotating in the predetermined direction and the rotational speed of the input member does not exceed the rotational speed of the output member to cause the electric motor to generate electricity.

In yet another form, the teachings of the present disclosure provide a method for operating an electrically-powered auxiliary power train that includes: providing an electrically-powered auxiliary power train having an electric motor, a gear reduction unit, a clutch and a wheel hub that is adapted for mounting a vehicle wheel thereon, the motor being configured to selectively drive the wheel hub through the gear reduction unit and the clutch, the clutch being an overrunning clutch that de-couples the electric motor from the wheel hub when a rotational speed of the wheel hub exceeds a first predetermined speed; identifying a braking event; and locking the clutch to transmit rotary power between the wheel hub and the electric motor to cause the electric motor to generate electricity and slow the speed of the wheel hub when the rotational speed of the wheel hub exceeds the first predetermined speed and the braking event has been identified.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION OF THE VARIOUS EMBODIMENTS

Figure 1:
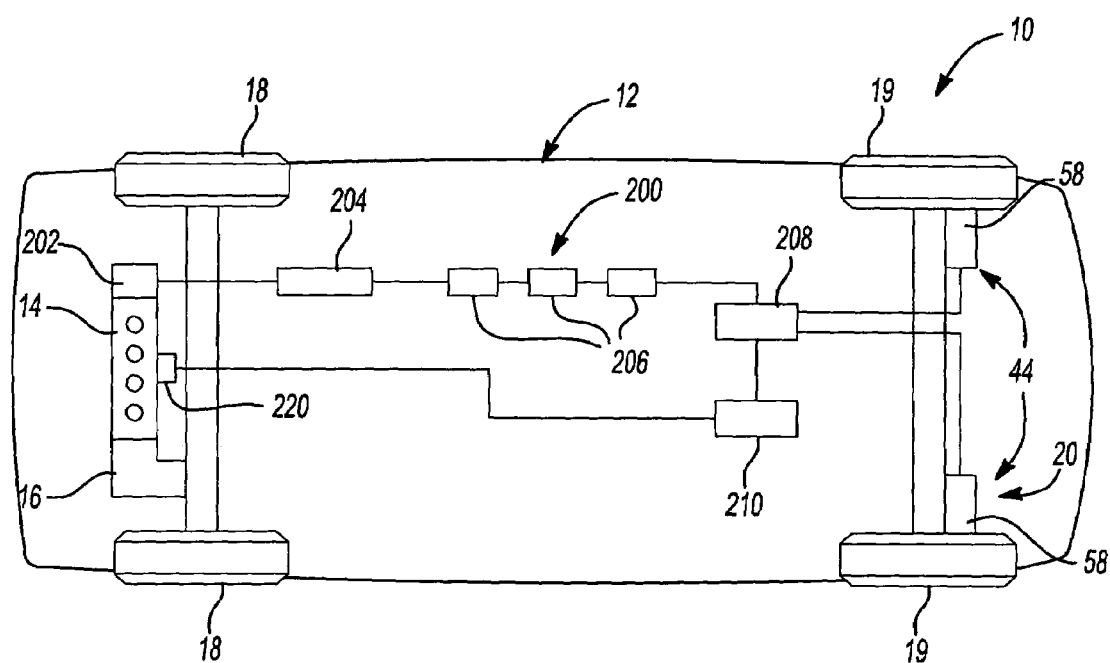
FIG. 1 is a schematic illustration of an exemplary vehicle having a hybrid power train constructed in accordance with the teachings of the present disclosure.

With reference to FIG. 1 of the drawings, a vehicle constructed in accordance with the teachings of the present disclosure is generally indicated by reference numeral 10. The vehicle 10 can include a body 12 to which an engine 14, a transmission 16, a set of front wheels 18 and a rear suspension module 20 can be coupled. In the particular example provided, the engine 14 and transmission 16 cooperate to provide drive torque to the set of front wheels 18.

Figure 2:
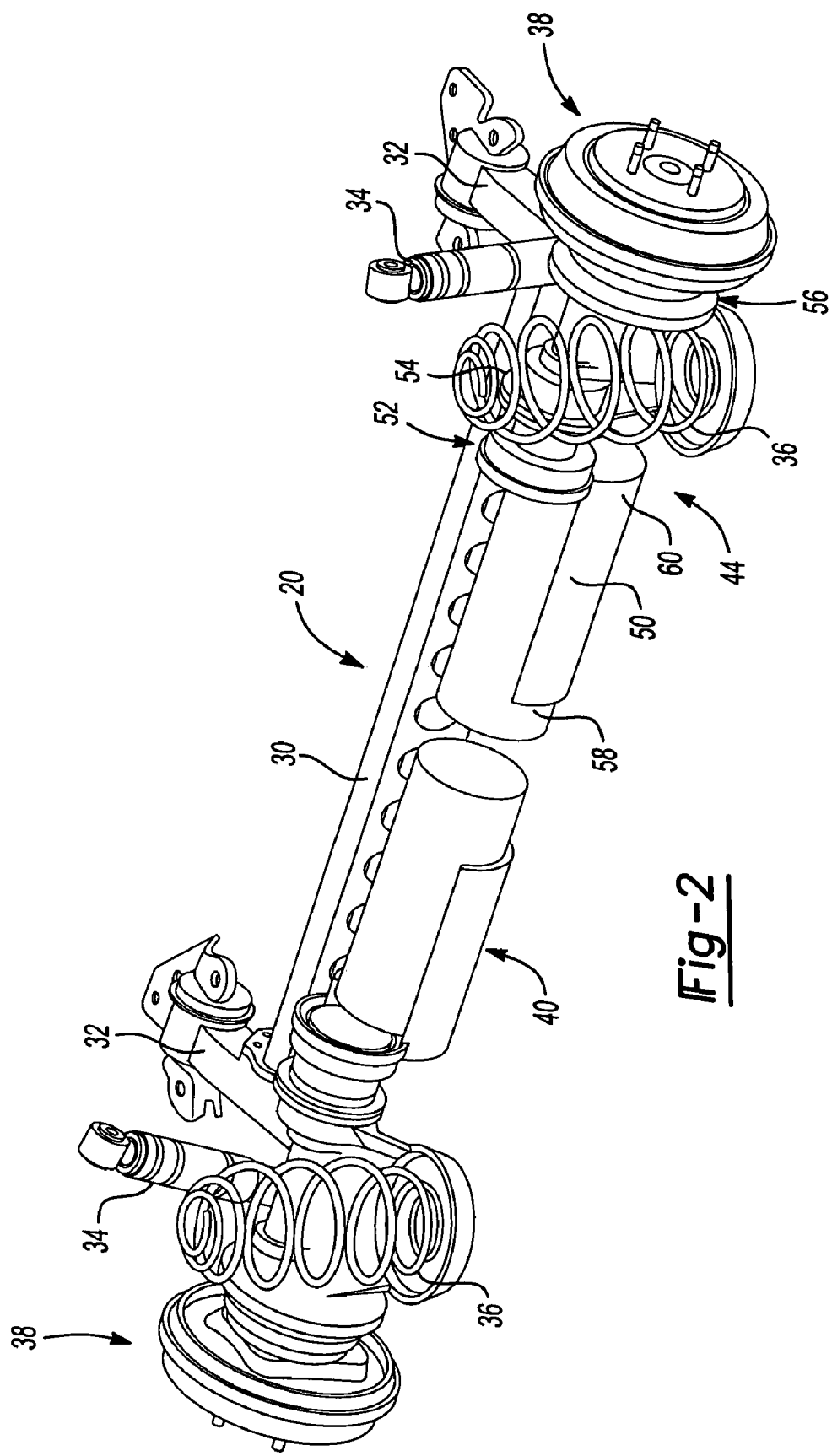
FIG. 2 is a perspective view of a portion of the vehicle of FIG. 1 illustrating the hybrid power train in more detail.

With additional reference to FIG. 2, the rear suspension module 20 can include a twist beam 30, a pair of control arms 32, a pair of shock absorbers 34, a pair of suspension springs 36, a pair of wheel hubs 38 and an auxiliary drive system 40. The control arms 32 can couple respective wheel hubs 38 to the body (not shown) of the vehicle 10, while the twist beam 30 can conventionally couple the control arms 32 to one another. The shock absorbers 34 and the suspension springs 36 can permit the rear suspension module 20 to be resiliently coupled to the vehicle body in a manner that is conventional and well known in the art.

Figure 3:
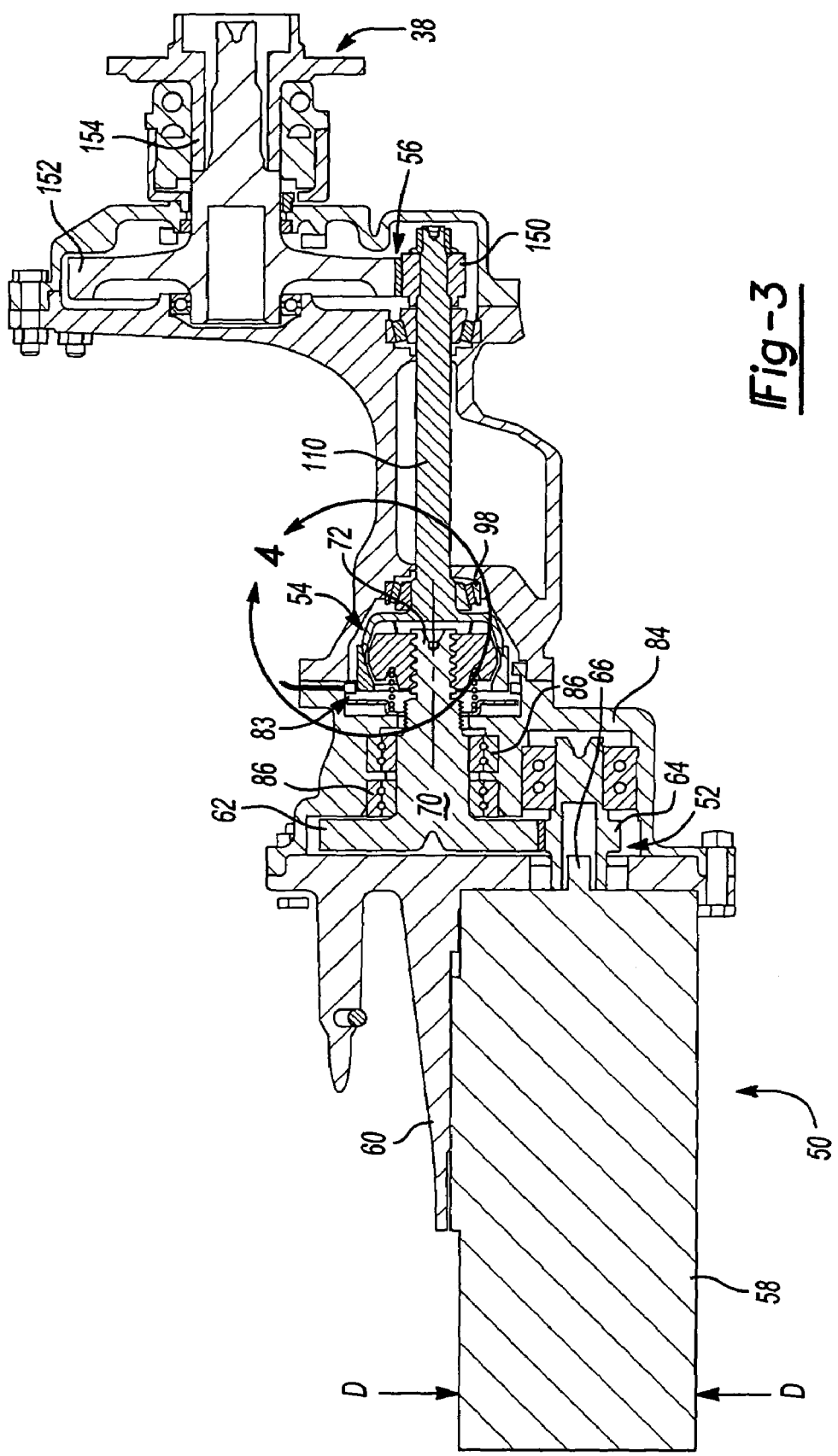
FIG. 3 is a longitudinal section view of a portion of the hybrid power train.

The auxiliary drive system 40 can include a pair drive units 44 and each of the drive units 44 can include a motor assembly 50, a first reduction gear set 52, a clutch 54, and a second reduction gear set 56. With reference to FIGS. 2 and 3, the motor assembly 50 of the particular example provided includes an electric motor 58 and a mounting bracket 60 that couples the electric motor 58 to the twist beam 30. The electric motor 58 can be a low voltage (i.e., $\leq 50$ volts) electric motor, such as a brush-type direct current (DC) motor or a SepEx® motor, and can have an outer diameter D that is less than 8 inches and more preferably, less than about 6 inches. The electric motor 58 can have a maximum sustained torque of at least about 30 ft.-lbs. and more preferably a maximum sustained torque of about 40 ft.-lbs. to about 50 ft.-lbs.

The electric motor 58 can output drive torque to the first reduction gear set 52, which is operable for performing a speed reduction and torque multiplication operation. The first reduction gear set 52 can have a gear ratio of about 5:1 to about 2:1. In the particular example provided, the first reduction gear set 52 utilizes a spur gear 62 having helical gear teeth that are meshingly engaged with pinion 64 that is driven by the output shaft 66 of the electric motor 58. An intermediate output shaft 70 that is coupled for rotation with the spur gear 62 can provide an input to the clutch 54. The clutch 54 can be an overrunning-type clutch that permits an associated one of the rear wheels 19 (FIG. 1) to coast when an associated one of the electric motors 58 is not operated rather than to "back drive" the electric motor 58.

Figure 4:
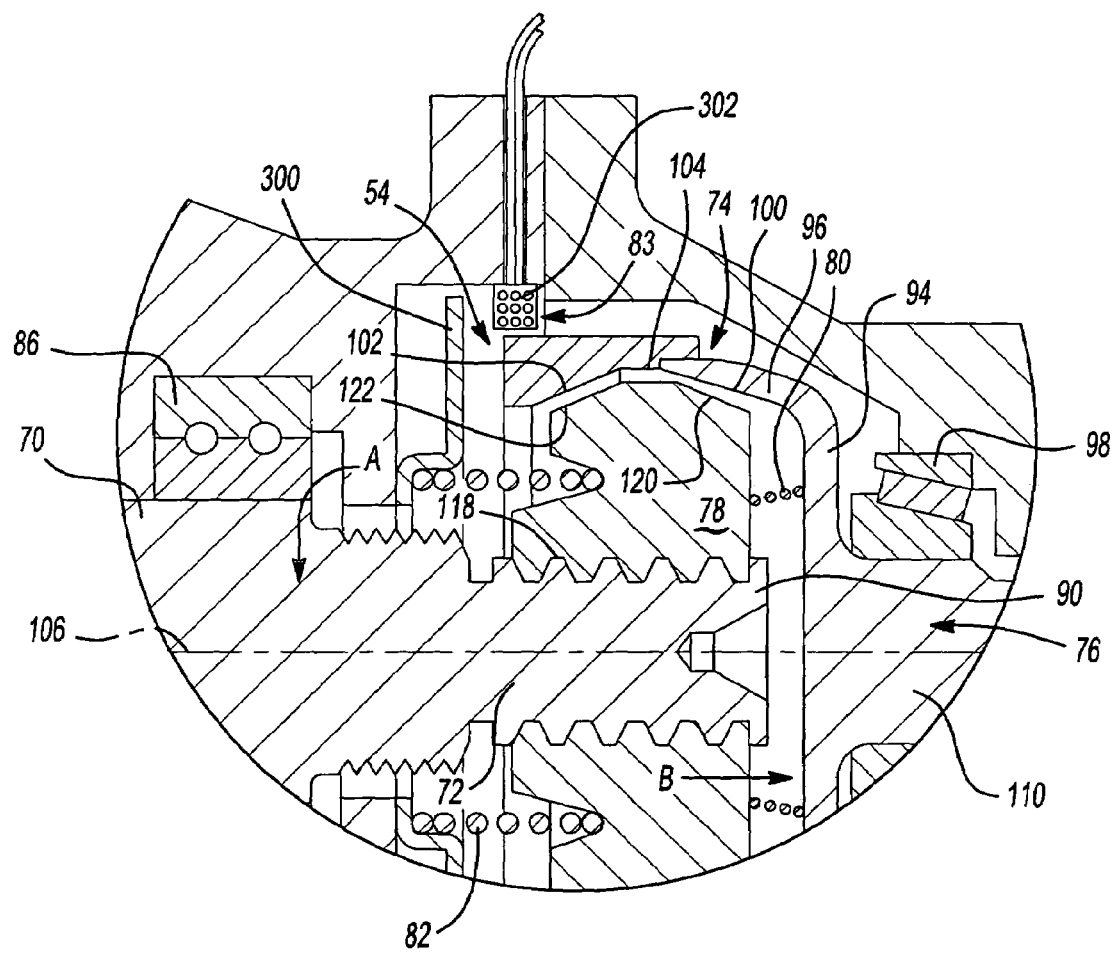
FIG. 4 is an enlarged portion of FIG. 3 illustrating the clutch in more detail.

The clutch can be any appropriate type of clutch, including an overrunning clutch, a slip clutch or a clutch having an inertia disk, actuator and pressure plates (e.g., a wet clutch). Moreover, it will be appreciated that the clutch could be actuated through various mechanical, hydraulic and/or electrical means. With reference to FIG. 4, the clutch 54 can include an input shaft 72, an outer cone structure 74, an output shaft 76, an inner cone structure 78, a pair of biasing springs 80 and 82, respectively, and a coil assembly 83. The input shaft 72 can be supported for rotation within a clutch housing 84 by a pair of first bearings 86 and can be coupled for rotation with the intermediate output shaft 70 of the first reduction gear set 52. Optionally, the intermediate output shaft 70 and the input shaft 72 can be unitarily formed. The input shaft 72 can include a threaded portion 90 that can be formed with any appropriate thread form, such as an Acme or square thread.

The outer cone structure 74 can be generally cup-shaped with a hub portion 94 and an annular wall 96. A second bearing 98 can be employed to mount the outer cone structure 74 to the clutch housing 84 such that the annular wall 96 is rotatably disposed about the threaded portion 90 of the input shaft 72. The annular wall 96 can include first and second interfaces 100 and 102, respectively, that are disposed on opposite axial sides of a rest zone 104. The first interface 100 tapers inwardly toward the rotational center line 106 of the outer cone structure 74 as one traverses the profile of the first interface 100 from a first point, which can be located adjacent the rest zone 104, to a second point that can be located proximate the hub portion 94. Stated another way, the first interface 100 can have a shape that corresponds to the exterior surface of a frustum.

It will be appreciated that the second interface 102 can be constructed as a mirror image of the first interface 100, as is illustrated in the particular example provided. Construction in this manner permits a common clutch 54 to be used for each of the drive units 44 (FIG. 2) and as such, reduces the complexity and cost of the auxiliary drive system 40 (FIG. 2). Accordingly, a detailed discussion of the second interface 102 need not be provided herein. It will also be appreciated that the second interface 102 could be constructed somewhat differently than the first interface 100 so as to provide different locking characteristics depending upon the rotational direction of the input to the clutch 54. For example, the angle of the cone that defines the second interface 102 could be different than the angle of the cone that defines the first interface 100.

The output shaft 76 can be coupled for rotation with the outer cone structure 74. In the particular example provided, the output shaft 76 includes a cylindrically-shaped shank portion 110 that can be unitarily formed with a portion of the outer cone structure 74.

The inner cone structure 78 can have an internally threaded aperture 118 and first and second mating interfaces 120 and 122, respectively. The internally threaded aperture 118 can have a thread form that threadably engages the threaded portion 90 of the input shaft 72 so that rotation of the input shaft 72 relative to the inner cone structure 78 will cause the inner cone structure 78 to translate along a rotational axis of the input shaft 72. The first and second mating interfaces 120 and 122 can be configured to matingly engage the first and second interfaces 100 and 102, respectively. In this regard, the first mating interface 120 can have a shape that can be configured to matingly engage the first interface 100, while the second mating interface 122 can have a shape that can be configured to matingly engage the second interface 102.

The biasing springs 80 and 82 cooperate to bias the inner cone structure 78 into a position relative to the rest zone 104 such that the first and second mating interfaces 120 and 122 are spaced apart from the first and second interfaces 100 and 102, respectively. The biasing springs 80 and 82 can be any type of resilient device, but in the particular embodiment illustrated, are helical compression-type springs. In the particular example provided, the biasing spring 80 is disposed between the hub portion 94 and a first axial end of the inner cone structure 78, while the biasing spring 82 is disposed between the clutch housing 84 and a second axial end of the inner cone structure 78 that is opposite the first axial end.

In situations where the input shaft 72 is rotating at a speed that is less than a rotational speed of the outer cone structure 74, the inner cone structure 78 will be biased into a neutral position (shown in FIG. 4) by the biasing springs 80 and 82 so that the first and second mating interfaces 120 and 122 are spaced apart from the first and second interfaces 100 and 102, respectively. In this condition, drive torque cannot be transmitted between the inner cone structure 78 and the outer cone structure 74. In situations where the input shaft 72 is rotating at a speed that is greater than a rotational speed of the outer cone structure 74, the inner cone structure 78 will rotate about the threaded portion 90 of the input shaft 72 and translate toward one of the first and second interfaces 100 and 102 depending upon the direction in which the input shaft 72 is rotating. Contact between an interface and a mating interface will effectively lock the inner cone structure 78 to the outer cone structure 74 to permit torque to be transmitted therebetween.

For example, rotation of the input shaft 72 in the direction of arrow A at a rotational speed that exceeds the rotational speed of the outer cone structure 74 will cause the inner cone structure 78 to translate in the direction of arrow B so that the first mating interface 120 engages the first interface 100. Similarly, rotation of the input shaft 72 in a direction opposite that of arrow A at a rotational speed that exceeds the rotational speed of the outer cone structure 74 will cause the inner cone structure 78 to translate in a direction opposite that of arrow B so that the second mating interface 122 engages the second interface 102.

As will be appreciated, the biasing springs 80 and 82 can cooperate to disengage the inner cone structure 78 from the outer cone structure 74 in situations where the inner cone structure 78 decelerates so that it has a rotational speed that is less than that of the outer cone structure 74.

The coil assembly 83 can include an armature 300 and a coil 302. The armature 300 can be an annular structure that can be mounted within the clutch housing 84 and configured to axially translate along the rotational axis of the input shaft 72. The armature 300 can engage the biasing spring 82 and can be biased by the biasing spring 82 in a direction opposite the coil 302. The coil 302 can be mounted to the clutch housing 84 and can be activated to draw the armature 300 toward it and cause the armature 300 to compress the biasing spring 82. The additional force applied by the biasing spring 82 onto the inner cone structure 78 when the coil 302 is activated causes the inner cone structure 78 to translate along the input shaft 72 and engage the outer cone structure 74 to permit torque to be transmitted between the input shaft 72 and the output shaft 76.

With reference to FIGS. 2 and 3, the second reduction gear set 56 is operable for performing a speed reduction and torque multiplication operation and can have a gear ratio of about 2:1 to about 5:1. The second reduction gear set 56 can include a pinion 150 having helical gear teeth that are meshingly engaged with gear teeth associated with an output gear 152. The output gear 152 can be integrally formed with or mounted to a hub portion 154 of the wheel hub 38 that rotates when the associated rear wheel 19 (FIG. 1) rotates. In the particular example provided, the output gear 152 is coupled to the hub portion 154 of the wheel hub 38 via a spline connection. The hub portion 154 can otherwise be configured in a conventional and well known manner.

With renewed reference to FIG. 1, the electrical system 200 of the vehicle 10 is schematically illustrated. The electrical system 200 can include an alternator 202, a power inverter 204, one or more supplemental batteries 206, a motor controller 208 and a vehicle controller 210. The alternator 202 can be configured to provide an output with a voltage that is appropriate for charging the supplemental batteries 206. In the particular example provided, the supplemental batteries 206 are low-voltage batteries (i.e., $\leq 50$ volts), such as 36 volt batteries, and can be configured in a manner so that they tolerate deep cycling (i.e., the repetitive discharge of about 80% of the maximum stored power of the supplemental batteries 206).

The power inverter 204, which is optional, can be employed to change the voltage of the electrical energy produced by the alternator 202 to a voltage that is compatible with the voltage requirements of the remainder of the electrical system 200 of the vehicle 10. In the particular example provided, the power inverter 204 performs a step-down function wherein the voltage of the electrical energy produced by the alternator 202 is stepped-down from 36 volts to 12 volts so that the remainder of the vehicle electrical system 200 that is not specifically discussed herein may be configured in a conventional and well known manner.

The motor controller 208 can be configured to distribute electrical power from the supplemental batteries 206 to the electric motors 58. The motor controller 208 can be any type of motor controller, but in the particular example provided the motor controller 208 is configured to control the DC voltage that is applied to the electric motors 58. In the embodiment provided, the motor controller 208 is a Model 1244 motor controller marketed by Curtis Instruments, Inc. of Mount Kisco, N.Y.

The vehicle controller 210 can be coupled to the motor controller 208 and a vehicle control module 220, which can be conventionally configured to control the operation of the engine 14 and the transmission 16. The vehicle controller 210 can receive the following inputs (e.g., from the vehicle control module 220): left front wheel speed; right front wheel speed; left rear wheel speed; right rear wheel speed; throttle position; brake activation; gear shift position; voltage of each of the supplemental batteries 206, alternator current, engine speed, vehicle speed and ignition status (on/off). The vehicle controller 210 can provide the following outputs: motor enable signal, motor direction signal, motor speed signal, state of charge signal, power in/out signal and coil assembly activation.

The motor enable signal may be generated by the vehicle controller 210 upon the occurrence of a predetermined event or sequence of events to cause the motor controller 208 to activate the electric motors 58. For example, the vehicle controller 210 can be configured to identify those situations where one or both of the front wheels 18 of the vehicle 10 are slipping. Slipping may be identified, for example, by determining whether a difference between the wheel speeds of the front wheels 18 exceeds a predetermined differential, or by determining whether a difference between a speed of the perimeter of each front wheel and the vehicle speed exceeds a predetermined differential. Additionally or alternatively, the vehicle controller 210 can be configured to identify those situations where rapid acceleration of the vehicle is desired. For example, the vehicle controller 210 can determine if the speed of the vehicle is below a predetermined threshold and the throttle of the engine is opened significantly thereby indicating that the operator of the vehicle desires that the vehicle accelerate relatively rapidly.

Generation of the motor enable signal can also be conditioned upon the occurrence of other events or conditions, such as a speed of the vehicle 10 is less than a predetermined speed threshold (e.g., 25 miles per hour), the ignition status is on, the gear selector (not shown) is in a predetermined position (e.g., a forward gear setting or a reverse gear setting), the voltage of the supplemental batteries 206 exceeds a predetermined threshold and the vehicle brakes (not shown) have not been actuated by the vehicle operator.

The motor direction signal can be generated by the vehicle controller 210 to designate the direction in which the electric motors 58 are to turn their respective rear wheels 19. The vehicle controller 210 can determine the motor direction signal (i.e., forward or reverse) based on the position of the gear selector (not shown). The motor speed signal can be generated by the vehicle controller 210 to designate a speed at which the rear wheels 19 (or a related component, such as the output shafts of the electric motors 58) are to turn. The state of charge signal can be generated by the vehicle controller 210 to designate those situations where the supplemental batteries 206 are charged to a predetermined level. The power in/out signal can be employed to communicate information to another control system or to the vehicle operator. In the example provided, the power in/out signal is employed to light a telltale indicator (not shown) in the instrument panel (not shown) to inform the vehicle operator when electric motors 58 are activated.

The motor controller 208 can be configured such that it will not activate the electric motors 58 unless it receives the motor enable signal in addition to one or more of the motor direction signal, the motor speed signal and the state of charge signal.

It will be appreciated that once activated, the electric motors 58 will produce supplementary power that will be output to the first reduction gear set 52. If the output of the first reduction gear set 52 is rotating at a speed that is faster than that of the input of the second reduction gear set 56, power will be transmitted through the clutch 54 to the second reduction gear set 56 and ultimately to an associated one of the rear wheels 19.

The coil assembly activation signal can be generated by the vehicle controller 210 to initiate regenerative braking when a braking event has been identified. A braking event can be identified by the vehicle controller 210 through the brake activation signal. Receipt of the coil assembly activation signal by the coil 302 (FIG. 4) can activate the coil 302, which can move the armature 300 (FIG. 4) and cause the inner cone structure 78 to lock to the outer cone structure 74 to permit torque to be transmitted therebetween. It will be appreciated that torque will be transmitted through the overrunning clutch 54 when the speed of the input shaft 72 is less than the speed of the output shaft 76. Accordingly, the electric motor 58 can be back-driven by the wheel hub 38 to generate electricity and/or to absorb power and thereby provide a vehicle braking effect.

In its most basic form, the vehicle controller 210 can be configured to set the coil assembly activation signal to one of two levels (e.g., the coil assembly activation signal can be on or off). Alternatively, the vehicle controller 210 can be configured to vary the coil assembly activation signal or to modulate or toggle the coil assembly activation signal between two levels (e.g., on and off) to cause the coil assembly 83 (FIG. 4) to change the force that is exerted by the biasing spring 82 (FIG. 4). Construction in this latter manner permits the vehicle controller 210 to operate the clutch 54 (FIG. 4) so as to provide limited slippage, which may be advantageous in some situations, such as to prevent overspeeding of the electric motor 58.

It will be appreciated from this disclosure that the coil assembly 83 could, in the alternative, be associated with a friction plate (not shown) that can be movably mounted on but coupled for rotation with one of the input shaft 72 and the output shaft 76. Activation of the coil assembly 83 could translate the friction plate into engagement with a mating friction plate (not shown) that is coupled for rotation with the other one of the input shaft 72 and the output shaft 76.

While specific examples have been described in the specification and illustrated in the drawings, it will be understood by those of ordinary skill in the art that various changes may be made and equivalents may be substituted for elements thereof without departing from the scope of the present disclosure as defined in the claims. For example, it will be appreciated from this disclosure that the electric motor 58 could be an AC induction motor and/or that the clutch 54 could be a slip clutch or omitted altogether. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out this invention, but that the scope of the present disclosure will include any embodiments falling within the foregoing description and the appended claims.

What is claimed is:

1. A suspension module comprising:
    at least one suspension component;
    a pair of wheel hubs that are coupled to the at least one suspension component, each wheel hub being adapted to be mounted to a vehicle wheel; and
    an auxiliary drive system having a pair of drive units, each drive unit being selectively operable for providing drive torque to an associated one of the wheel hubs, each drive unit including an electric motor, a first reduction gear set and a clutch, the first reduction gear set being disposed between the electric motor and the associated wheel hub and multiplying torque output from the electric motor, the clutch including:
        a clutch housing;
        an input member rotatably disposed in the clutch housing, the input member being drivingly coupled with an output shaft of the electric motor;
        an output member rotatably disposed in the clutch housing, the output member being drivingly coupled with the associated one of the wheel hubs;
        an engagement member that is threadably coupled to one of the input member and the output member and movable between a first position, wherein the engagement member is abutted against a first engagement surface to couple the input member and the output member for rotation with one another, a second position, wherein the engagement member is abutted against a second engagement surface to couple the input member and the output member for rotation with one another, and a neutral position, wherein the engagement member is spaced apart from both the first engagement surface and the second engagement surface;
        a first spring disposed between the clutch housing and a first side of the engagement member, the first spring biasing the engagement member toward the first engagement surface;
        a second spring disposed between the clutch housing and a second side of the engagement member, the second spring biasing the engagement member toward the second engagement surface;
        an armature that is coupled to the first spring; and
        a coil coupled to the clutch housing;
    wherein the clutch is operable for connecting the electric motor with the associated wheel hub when a rotational speed of the input member exceeds a rotational speed of the output member; and
    wherein the coil is selectively operable for moving the armature to compress the first spring to thereby move the engagement member into the first position when the rotational speed of the input member does not exceed a rotational speed of the output member.

2. The suspension module of claim 1, wherein the coil is mounted to the clutch housing.

3. The suspension module of claim 1, further comprising a controller coupled to the coil, the controller being operable for energizing and de-energizing the coil.

4. The suspension module of claim 3, wherein the controller is configured to operate the coil in a locked mode in which the coil is maintained in a continuously energized state.

5. The suspension module of claim 3, wherein the controller is configured to operate the coil in a semi-locked mode in which a state of the coil is dependent upon a value of a timer, a speed of the output member, a torque applied to the output member or combinations thereof.

6. The suspension module of claim 1, wherein each auxiliary drive system further includes a second reduction gear set disposed between the electric motor and the associated wheel hub.

7. The suspension module of claim 6, wherein the second reduction gear set includes an input gear, which is coupled for rotation with the second portion of the clutch, and a output gear which is coupled for rotation with the wheel hub.

8. The suspension module of claim 1, wherein the electric motor has an outer diameter that is less than about 8 inches.

9. The suspension module of claim 1, wherein the outer diameter is less than about 6 inches.

10. A method comprising:
    providing a suspension module with at least one suspension component, a pair of wheel hubs and an auxiliary drive system, each wheel hub being coupled to the at least one suspension component and adapted to be mounted to a vehicle wheel, the auxiliary drive system having a pair of drive units, each drive unit including an electric motor, a first reduction gear set and a clutch, the first reduction gear set being disposed between the electric motor and the associated wheel hub and multiplying torque output from the electric motor, the clutch being disposed between the first reduction gear set and the wheel hub and having an input member, an output member, an engagement member and a coil assembly, the engagement member being threadably coupled to one of the input member and the output member and movable between a first position, wherein the engagement member is abutted against a first engagement surface to couple the input member and the output member for rotation with one another, and a neutral position, wherein the engagement member is spaced apart from the first engagement surface, the engagement member being biased into the neutral position and moving into the first position in response to rotation of the input member in a predetermined rotational direction at a rotational speed that exceeds a rotational speed of the output member; and
    activating the coil assembly to place the engagement member in the first position when the input member is rotating in the predetermined direction and the rotational speed of the input member does not exceed the rotational speed of the output member to cause the electric motor to generate electricity.

11. The method of claim 10, wherein the coil assembly includes an armature and a coil that is configured to move the armature.

12. The method of claim 11, wherein activating the coil assembly includes maintaining the coil in a continuously energized state.

13. The method of claim 11, wherein activating the coil assembly includes maintaining the coil in an intermittently energized state that is comprised of an alternating series of first events, wherein the coil is maintained in a continuously energized state, and second events, wherein the coil is maintained in a continuously de-energized state.

14. The method of claim 13, wherein a duration of the first events is based upon a value of a timer, a speed of the output member, a torque applied to the output member or combinations thereof.

15. A method for operating an electrically-powered auxiliary power train comprising:

providing an electrically-powered auxiliary power train having an electric motor, a gear reduction unit, a clutch and a wheel hub that is adapted for mounting a vehicle wheel thereon, the motor being configured to selectively drive the wheel hub through the gear reduction unit and the clutch, the clutch being an overrunning clutch that de-couples the electric motor from the wheel hub when a rotational speed of the wheel hub exceeds a first predetermined speed, the overrunning clutch is a cone clutch having an input member, an output member and an engagement member that is threadably coupled to the input member and axially translatable between a first position in which drive torque is transmitted between the input member and the output member, and a second position in which drive torque is not transmitted between the input member and the output member;

identifying a braking event; and locking the clutch to transmit rotary power between the wheel hub and the electric motor to cause the electric motor to generate electricity and slow the speed of the wheel hub when the rotational speed of the wheel hub exceeds the first predetermined speed and the braking event has been identified.

16. The method of claim 15, wherein a spring biases the engagement member toward the second position.

17. The method of claim 16, wherein the clutch includes a coil assembly, having an armature and a coil, and wherein locking the clutch includes activating the coil to move the armature and compress the spring.

18. A suspension module comprising:

a suspension component;

a pair of wheel hubs coupled to the suspension component; and an auxiliary drive system having a pair of drive units, each drive unit being selectively operable for providing drive torque to an associated one of the wheel hubs, each drive unit including an electric motor, a reduction gear set and a clutch, the reduction gear set disposed between the electric motor and the associated wheel hub, the clutch including a clutch housing, an input member rotatably disposed in the clutch housing and drivingly coupled with an output shaft of the electric motor, an output member rotatably disposed in the clutch housing and drivingly coupled with the associated one of the wheel hubs, an engagement member threadably coupled to one of the input member and the output member and movable between a first position wherein the engagement member is abutted against a first engagement surface, a second position wherein the engagement member is abutted against a second engagement surface, and a neutral position wherein the engagement member is spaced apart from both of the first and second engagement surfaces, a first spring disposed between the clutch housing and a first side of the engagement member for biasing the engagement member toward the first engagement surface, a second spring disposed between the clutch housing and a second side of the engagement member for biasing the engagement member toward the second engagement surface, an armature, and a coil coupled to the clutch housing that is selectively operable for moving the armature to compress the first spring to thereby move the engagement member into the first position.

* * * * *